US012717493B2

(12) United States Patent
Serratos Hernandez

(10) Patent No.: US 12,717,493 B2
(45) Date of Patent: Aug. 25, 2026

(54) SELECTIVE MULTITHREADED EXECUTION OF MEMORY TRAINING BY CENTRAL PROCESSING UNIT(CPU) SOCKETS

(71) Applicant: Intel Corporation, Santa Clara, CA (US)

(72) Inventor: Jorge Serratos Hernandez, Cedar Park, TX (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/943,005

(22) Filed: Sep. 12, 2022

(65) Prior Publication Data

US 2023/0039807 A1 Feb. 9, 2023

(51) Int. Cl.
*G06F 3/06* (2006.01)

(52) U.S. Cl.
CPC .......... *G06F 3/0617* (2013.01); *G06F 3/0653* (2013.01); *G06F 3/0673* (2013.01)

(58) Field of Classification Search
None
See application file for complete search history.

(56) References Cited

U.S. PATENT DOCUMENTS 9,214,199 B2 12/2015 Brandl et al.
11,455,261 B2 9/2022 Li et al.
2012/0191964 A1* 7/2012 Lee .................... G06F 11/2289 713/2
2014/0143579 A1* 5/2014 Grokop ................ G06F 9/4893 713/340
2019/0050160 A1* 2/2019 Dardis ................. G06F 3/0673
2020/0293415 A1* 9/2020 Mukherjee ............ G06N 20/00

OTHER PUBLICATIONS

Alan Sguigna, "Memory Training, Testing, and Margining", ASSET-InterTech, Inc., Nov. 2, 2014, https://www.asset-intertech.com/resources/blog/2014/11/memory-training-testing-and-margining/ [retrieved Nov. 29, 2022], 4 pages.
Atlassian, "Calculating the cost of downtime", Incident Management, 2022, https://www.atlassian.com/incident-management/kpis/cost-of-downtime# [retrieved Nov. 29, 2022], 6 pages.

(Continued)

*Primary Examiner* — Jared I Rutz
*Assistant Examiner* — Alexander J Yoon
(74) *Attorney, Agent, or Firm* — Jaffery Watson Hamilton & DeSanctis LLP

(57) ABSTRACT

Embodiments described herein are generally directed to selective multithreaded execution of memory training by CPU sockets. In an example, a memory configuration and a current phase of execution of memory training for each of multiple CPU sockets of a computer system is received. Based on the memory configuration and the current phase of execution of each of the CPU sockets an estimated power usage across all CPU sockets may be determined. Based on the estimated power usage and a power consumption threshold (e.g., PTAM or PA), performance of the current phase of execution of one or more CPU sockets may be selectively released for one or more channels of the one or more CPU sockets.

20 Claims, 7 Drawing Sheets

(56) References Cited

OTHER PUBLICATIONS

Binary Debt, "How Does an Intel Processor Boot?", Systems programming, computer architecture & algorithms, Oct. 6, 2018, https://binarydebt.wordpress.com/2018/10/06/how-does-an-x86-processor-boot/ [retrieved Nov. 29, 2022], 20 pages.
Eventhelix, "Hardware Diagnostics and Power on Self Tests", Fault Handling, https://www.eventhelix.com/fault-handling/hardware-diagnostics/#PowerOnSelfTests [retrieved Nov. 29, 2022], 6 pages.
Premio, Inc., "What is a CPU Socket"?, May 21, 2021, https://premioinc.com/blogs/blog/what-is-a-cpu-socket [retrieved Nov. 29, 2022], 13 pages.
Robert Sheldon, "What is Power-On Self-Test (POST)?", TechTarget, https://www.techtarget.com/whatis/definition/POST-Power-On-Self-Test [retrieved Nov. 29, 2022], 5 pages.
Wikipedia, "Memory Code Reference", Jun. 26, 2021, https://en.wikipedia.org/wiki/Memory_Reference_Code [retrieved Nov. 29, 2022], 2 pages.

* cited by examiner

300

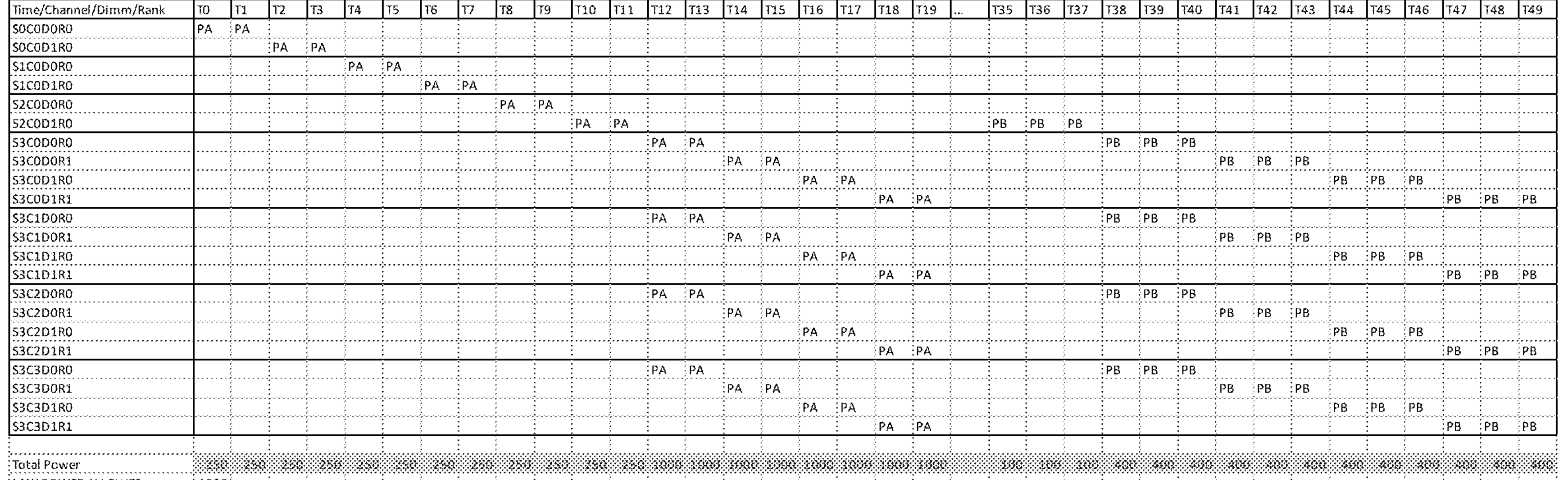

| Time/Channel/Dimm/Rank | T0 | T1 | T2 | T3 | T4 | T5 | T6 | T7 | T8 | T9 | T10 | T11 | T12 | T13 | T14 | T15 | T16 | T17 | T18 | T19 | ... | T35 | T36 | T37 | T38 | T39 | T40 | T41 | T42 | T43 | T44 | T45 | T46 | T47 | T48 | T49 |
|---|---|---|---|---|---|---|---|---|---|---|---|---|---|---|---|---|---|---|---|---|---|---|---|---|---|---|---|---|---|---|---|---|---|---|---|---|
| S0C0D0R0 | PA | PA |  |  |  |  |  |  |  |  |  |  |  |  |  |  |  |  |  |  |  |  |  |  |  |  |  |  |  |  |  |  |  |  |  |  |
| S0C0D1R0 |  |  | PA | PA |  |  |  |  |  |  |  |  |  |  |  |  |  |  |  |  |  |  |  |  |  |  |  |  |  |  |  |  |  |  |  |  |
| S1C0D0R0 |  |  |  |  | PA | PA |  |  |  |  |  |  |  |  |  |  |  |  |  |  |  |  |  |  |  |  |  |  |  |  |  |  |  |  |  |  |
| S1C0D1R0 |  |  |  |  |  |  | PA | PA |  |  |  |  |  |  |  |  |  |  |  |  |  |  |  |  |  |  |  |  |  |  |  |  |  |  |  |  |
| S2C0D0R0 |  |  |  |  |  |  |  |  | PA | PA |  |  |  |  |  |  |  |  |  |  |  |  |  |  |  |  |  |  |  |  |  |  |  |  |  |  |
| S2C0D1R0 |  |  |  |  |  |  |  |  |  |  | PA | PA |  |  |  |  |  |  |  |  |  | PB | PB | PB |  |  |  |  |  |  |  |  |  |  |  |  |
| S3C0D0R0 |  |  |  |  |  |  |  |  |  |  |  |  | PA | PA |  |  |  |  |  |  |  |  |  |  | PB | PB | PB |  |  |  |  |  |  |  |  |  |
| S3C0D0R1 |  |  |  |  |  |  |  |  |  |  |  |  |  |  | PA | PA |  |  |  |  |  |  |  |  |  |  |  | PB | PB | PB |  |  |  |  |  |  |
| S3C0D1R0 |  |  |  |  |  |  |  |  |  |  |  |  |  |  |  |  | PA | PA |  |  |  |  |  |  |  |  |  |  |  |  | PB | PB | PB |  |  |  |
| S3C0D1R1 |  |  |  |  |  |  |  |  |  |  |  |  |  |  |  |  |  |  | PA | PA |  |  |  |  |  |  |  |  |  |  |  |  |  | PB | PB | PB |
| S3C1D0R0 |  |  |  |  |  |  |  |  |  |  |  |  | PA | PA |  |  |  |  |  |  |  |  |  |  | PB | PB | PB |  |  |  |  |  |  |  |  |  |
| S3C1D0R1 |  |  |  |  |  |  |  |  |  |  |  |  |  |  | PA | PA |  |  |  |  |  |  |  |  |  |  |  | PB | PB | PB |  |  |  |  |  |  |
| S3C1D1R0 |  |  |  |  |  |  |  |  |  |  |  |  |  |  |  |  | PA | PA |  |  |  |  |  |  |  |  |  |  |  |  | PB | PB | PB |  |  |  |
| S3C1D1R1 |  |  |  |  |  |  |  |  |  |  |  |  |  |  |  |  |  |  | PA | PA |  |  |  |  |  |  |  |  |  |  |  |  |  | PB | PB | PB |
| S3C2D0R0 |  |  |  |  |  |  |  |  |  |  |  |  | PA | PA |  |  |  |  |  |  |  |  |  |  | PB | PB | PB |  |  |  |  |  |  |  |  |  |
| S3C2D0R1 |  |  |  |  |  |  |  |  |  |  |  |  |  |  | PA | PA |  |  |  |  |  |  |  |  |  |  |  | PB | PB | PB |  |  |  |  |  |  |
| S3C2D1R0 |  |  |  |  |  |  |  |  |  |  |  |  |  |  |  |  | PA | PA |  |  |  |  |  |  |  |  |  |  |  |  | PB | PB | PB |  |  |  |
| S3C2D1R1 |  |  |  |  |  |  |  |  |  |  |  |  |  |  |  |  |  |  | PA | PA |  |  |  |  |  |  |  |  |  |  |  |  |  | PB | PB | PB |
| S3C3D0R0 |  |  |  |  |  |  |  |  |  |  |  |  | PA | PA |  |  |  |  |  |  |  |  |  |  | PB | PB | PB |  |  |  |  |  |  |  |  |  |
| S3C3D0R1 |  |  |  |  |  |  |  |  |  |  |  |  |  |  | PA | PA |  |  |  |  |  |  |  |  |  |  |  | PB | PB | PB |  |  |  |  |  |  |
| S3C3D1R0 |  |  |  |  |  |  |  |  |  |  |  |  |  |  |  |  | PA | PA |  |  |  |  |  |  |  |  |  |  |  |  | PB | PB | PB |  |  |  |
| S3C3D1R1 |  |  |  |  |  |  |  |  |  |  |  |  |  |  |  |  |  |  | PA | PA |  |  |  |  |  |  |  |  |  |  |  |  |  | PB | PB | PB |
| Total Power | 250 | 250 | 250 | 250 | 250 | 250 | 250 | 250 | 250 | 250 | 250 | 250 | 1000 | 1000 | 1000 | 1000 | 1000 | 1000 | 1000 | 1000 |  | 100 | 100 | 100 | 400 | 400 | 400 | 400 | 400 | 400 | 400 | 400 | 400 | 400 | 400 | 400 |
| MAX POWER ALLOWED | 1000 |  |  |  |  |  |  |  |  |  |  |  |  |  |  |  |  |  |  |  |  |  |  |  |  |  |  |  |  |  |  |  |  |  |  |  |

| Time/Channel/Dimm/Rank | T0 | T1 | T2 | T3 | T4 | T5 | T6 | T7 | T8 | T9 | T10 | T11 | T12 | T13 | T14 | T15 | T16 | T17 | T18 | T19 |
|---|---|---|---|---|---|---|---|---|---|---|---|---|---|---|---|---|---|---|---|---|
| S0C0D0R0 | PA | PA | | | PB | PB | PB | | | | | | | | | | | | | |
| S0C0D1R0 | | | PA | PA | | | | PB | PB | PB | | | | | | | | | | |
| S1C0D0R0 | PA | PA | | | PB | PB | PB | | | | | | | | | | | | | |
| S1C0D1R0 | | | PA | PA | | | | PB | PB | PB | | | | | | | | | | |
| S2C0D0R0 | PA | PA | | | PB | PB | PB | | | | | | | | | | | | | |
| S2C0D1R0 | | | PA | PA | | | | PB | PB | PB | | | | | | | | | | |
| S3C0D0R0 | PA | PA | | | | | | | PB | PB | PB | | | | | | | | | |
| S3C0D0R1 | | | PA | PA | | | | | | | | PB | PB | PB | | | | | | |
| S3C0D1R0 | | | | | PA | PA | | | | | | | | | PB | PB | PB | | | |
| S3C0D1R1 | | | | | | | PA | PA | | | | | | | | | | PB | PB | PB |
| S3C1D0R0 | PA | PA | | | | | | | PB | PB | PB | | | | | | | | | |
| S3C1D0R1 | | | PA | PA | | | | | | | | PB | PB | PB | | | | | | |
| S3C1D1R0 | | | | | PA | PA | | | | | | | | | PB | PB | PB | | | |
| S3C1D1R1 | | | | | | | PA | PA | | | | | | | | | | PB | PB | PB |
| S3C2D0R0 | PA | PA | | | | | | | PB | PB | PB | | | | | | | | | |
| S3C2D0R1 | | | PA | PA | | | | | | | | PB | PB | PB | | | | | | |
| S3C2D1R0 | | | | | PA | PA | | | | | | | | | PB | PB | PB | | | |
| S3C2D1R1 | | | | | | | PA | PA | | | | | | | | | | PB | PB | PB |
| S3C3D0R0 | PA | PA | | | | | | | PB | PB | PB | | | | | | | | | |
| S3C3D0R1 | | | PA | PA | | | | | | | | PB | PB | PB | | | | | | |
| S3C3D1R0 | | | | | PA | PA | | | | | | | | | PB | PB | PB | | | |
| S3C3D1R1 | | | | | | | PA | PA | | | | | | | | | | PB | PB | PB |
| | | | | | | | | | | | | | | | | | | | | |
| Total Power | 1750 | 1750 | 1750 | 1750 | 1300 | 1300 | 1300 | 1300 | 700 | 700 | 400 | 400 | 400 | 400 | 400 | 400 | 400 | 400 | 400 | 400 |
| MAX POWER ALLOWED | 1000 | | | | | | | | | | | | | | | | | | | |

| Time/Channel/Dimm/Rank | T0 | T1 | T2 | T3 | T4 | T5 | T6 | T7 | T8 | T9 | T10 | T11 | T12 | T13 | T14 | T15 | T16 | T17 | T18 | T19 | T20 | T21 | T22 | T23 |
|---|---|---|---|---|---|---|---|---|---|---|---|---|---|---|---|---|---|---|---|---|---|---|---|---|
| S0C0D0R0 | PA | PA | | | | | | | PB | PB | PB | | | | | | | | | | | | | |
| S0C0D1R0 | | | PA | PA | | | | | | | | PB | PB | PB | | | | | | | | | | |
| S1C0D0R0 | PA | PA | | | | | | | PB | PB | PB | | | | | | | | | | | | | |
| S1C0D1R0 | | | PA | PA | | | | | | | | PB | PB | PB | | | | | | | | | | |
| S2C0D0R0 | PA | PA | | | | | | | | | | | PB | PB | PB | | | | | | | | | |
| S2C0D1R0 | | | PA | PA | | | | | | | | | | | | PB | PB | PB | | | | | | |
| S3C0D0R0 | PA | PA | | | | | | | | | | | PB | PB | PB | | | | | | | | | |
| S3C0D0R1 | | | PA | PA | | | | | | | | | | | | PB | PB | PB | | | | | | |
| S3C0D1R0 | | | | | PA | PA | | | | | | | | | | | | | PB | PB | PB | | | |
| S3C0D1R1 | | | | | | | PA | PA | | | | | | | | | | | | | | PB | PB | PB |
| S3C1D0R0 | | | | | PA | PA | | | | | | | PB | PB | PB | | | | | | | | | |
| S3C1D0R1 | | | | | | | PA | PA | | | | | | | | PB | PB | PB | | | | | | |
| S3C1D1R0 | | | | | | | | | PA | PA | | | | | | | | | PB | PB | PB | | | |
| S3C1D1R1 | | | | | | | | | | | PA | PA | | | | | | | | | | PB | PB | PB |
| S3C2D0R0 | | | | | PA | PA | | | | | | | PB | PB | PB | | | | | | | | | |
| S3C2D0R1 | | | | | | | PA | PA | | | | | | | | PB | PB | PB | | | | | | |
| S3C2D1R0 | | | | | | | | | PA | PA | | | | | | | | | PB | PB | PB | | | |
| S3C2D1R1 | | | | | | | | | | | PA | PA | | | | | | | | | | PB | PB | PB |
| S3C3D0R0 | | | | | PA | PA | | | | | | | PB | PB | PB | | | | | | | | | |
| S3C3D0R1 | | | | | | | PA | PA | | | | | | | | PB | PB | PB | | | | | | |
| S3C3D1R0 | | | | | | | | | PA | PA | | | | | | | | | PB | PB | PB | | | |
| S3C3D1R1 | | | | | | | | | | | PA | PA | | | | | | | | | | PB | PB | PB |
| | | | | | | | | | | | | | | | | | | | | | | | | |
| Total Power | 1000 | 1000 | 1000 | 1000 | 1000 | 1000 | 1000 | 1000 | 950 | 950 | 950 | 950 | 700 | 700 | 500 | 500 | 500 | 500 | 400 | 400 | 400 | 400 | 400 | 400 |
| MAX POWER ALLOWED | 1000 | | | | | | | | | | | | | | | | | | | | | | | |

FIG. 6

SELECTIVE MULTITHREADED EXECUTION OF MEMORY TRAINING BY CENTRAL PROCESSING UNIT(CPU) SOCKETS

TECHNICAL FIELD

Embodiments described herein generally relate to the field of multi-socket computer system configurations and boot processing (e.g., memory initialization/training during power-on self-test (POST)) and, more particularly, to a selective multithreading (SMT) approach that allows dynamic enablement of multithreading (MT) of memory training (e.g., execution of memory reference code (MRC) training algorithms) based on power constraints of the computer system and memory configurations of the respective central processing unit (CPU) sockets to achieve a particular boot processing goal, for example, minimizing boot time without exceeding the power constraints.

BACKGROUND

The average cost of server downtime is on the order of $2,300 to $9,000 per minute depending on factors like company size and industry vertical. As such, lower boot-time (which includes the time to perform POST to the start of loading of the operating system) is a highly desirable feature in high-end servers and data center applications, which are typically multi-socket configurations. Server computer system configurations up to eight CPU sockets are supported today and may increase to more CPU sockets in future server platform configurations to meet the demands of modern applications.

The continuing evolution of memory standards, supporting higher speeds and larger capacities, come at a cost of significantly increased boot-times, mainly due to new memory training steps. For example, the fifth generation of double data rate (DDR5) synchronous dynamic random-access memory (SDRAM) supports twice the speeds of the fourth generation of DDR (DDR4) and larger capacity; however, newer training steps, including TX and RX decision feedback equalization (DFE), are now implemented to counter high-speed channel noise, such as channel cross-talk, reflections, and Inter-symbol interference (ISI) and to ensure channel robustness in both timing and voltage domains at these higher speeds.

BRIEF DESCRIPTION OF THE DRAWINGS

Embodiments described here are illustrated by way of example, and not by way of limitation, in the figures of the accompanying drawings in which like reference numerals refer to similar elements.

FIG. 3 is a table illustrating units of time and units of power for each unit of time to perform serial execution of memory training for a particular computer system configuration having four CPU sockets and assuming two memory training phases.

FIG. 4 is a table illustrating units of time and units of power for each unit of time to perform fully parallel execution of memory training for the same computer system configuration and memory training phases as FIG. 3.

FIG. 6 is a table illustrating units of time and units of power for each unit of time to perform selective multithreading of memory training for the same computer system configuration and memory training phases as FIGS. 3 and 4.

DETAILED DESCRIPTION

Figure 1:
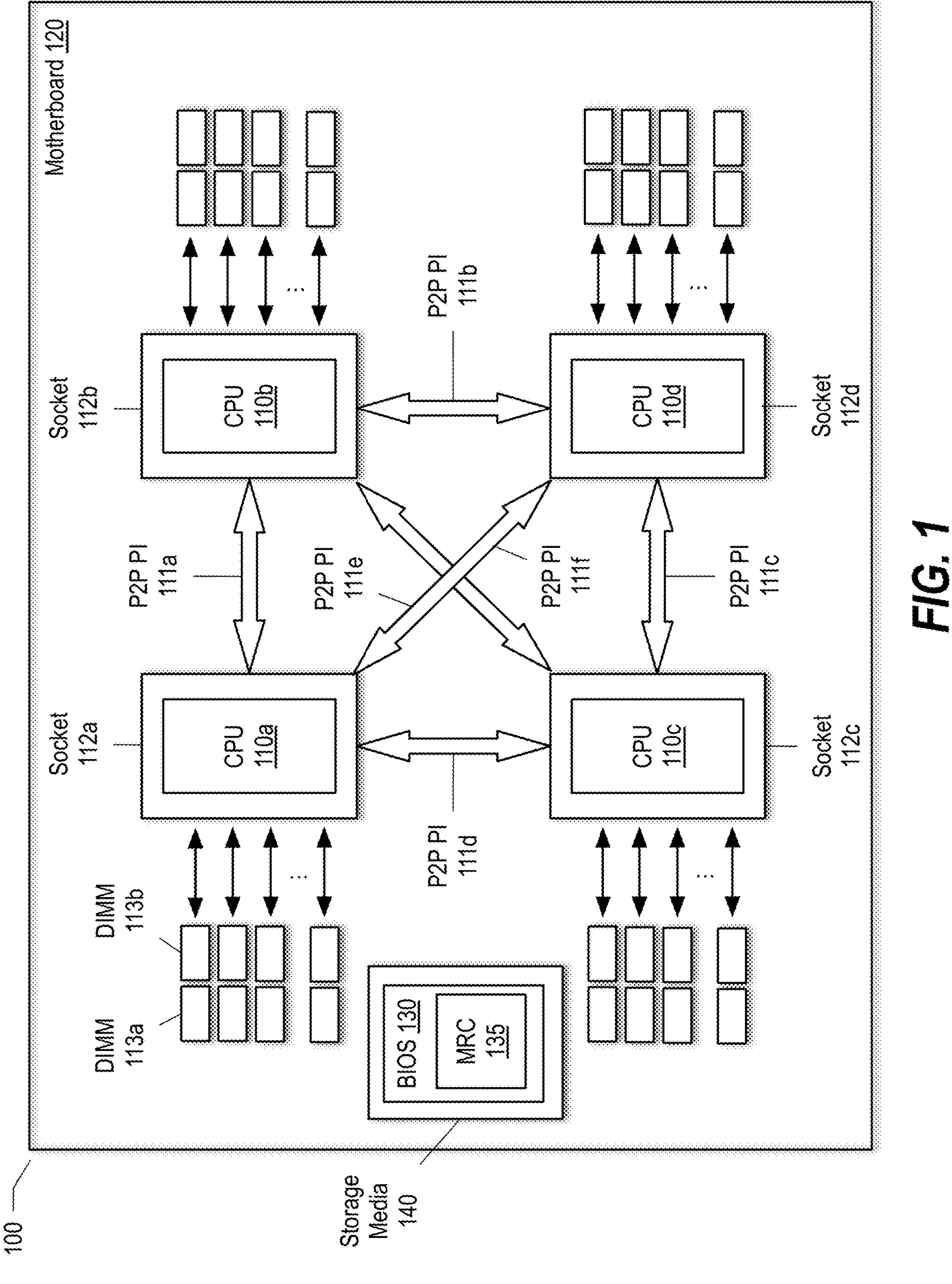
FIG. 1 is a block diagram illustrating an example of multi-socket computer system configuration.

Embodiments described herein are generally directed to selective multithreaded execution of memory training by CPU sockets. As noted above, the continuing evolution of memory standards to support higher speeds and larger capacities results in new memory training steps, which in turn increases boot-times. The problem of longer training times is exacerbated with multiple CPU sockets if the code for performing the memory training (e.g., memory reference code (MRC)) is executed serially from one CPU socket to another. To address this problem, memory training (e.g., execution of the MRC) may be performed on all CPU sockets in parallel through a feature called MultiThreading (MT).

Full-blown MT (executing all CPU sockets in parallel) is not generally preferred, however, since bringing up all CPU sockets in parallel may result in power related transients and noise. On the other hand, making this user-selectable requires all customers to be savvy about their platform and power related details. Often, the customers may not be able to select the right parameters that meet the platform boot-time and power requirements, risking potential damage to servers by exceeding the power constraints of the computer system (e.g., the voltage regulator modules (VRMs) of the motherboard).

Various embodiments described herein seek to address or at least mitigate limitations of existing memory training approaches by allowing dynamic enablement of MT on a specific number of CPU sockets based on platform requirements, channel population, DIMM types, and training requirements on the individual CPU sockets. For example, a boot strap processor (BSP) of the computer system dynamically evaluates the number of CPU sockets to be executed in parallel based on power constraints of the computer system and the memory configuration for each channel of each CPU socket to achieve a predetermined or configurable boot processing goal (e.g., fastest execution without exceeding the power constraints of the computer system). According to one embodiment, the BSP of the computer system receives information regarding a memory configuration and a current phase of execution of memory training of each of multiple CPU sockets of the computer system. An aggregate power usage (consumption) across the CPU sockets is estimated by the BSP based on the memory configuration and the current phase of execution of each of the CPU sockets. Based on the estimated power usage and a power consumption threshold, the current phase of execution of one or more respective CPU sockets is then selectively released for execution by the BSP for one or more channels of the one or more respective CPU sockets. The power consumption threshold may represent power constraints of the computer system and may be provided as an input parameter, for example, by an administrator of the computer system. In this manner, memory training time may be minimized without exceeding the power constraints at any time during the memory training process.

In some embodiments, the scheduling of the current phase of execution, for example, by a main scheduler running on the BSP, may prioritize release of the performance of the current phase of execution as selected by local schedulers of the respective CPU sockets in accordance with a bread-first approach abiding by the following rules (in order of decreasing priority).

First, attempt to accommodate at least one task per CPU socket. That is, prioritize execution of the current phase of execution for a given CPU socket of the multiple CPU sockets on at least one channel of the given CPU socket over allowing performance of the current phase of execution of another CPU socket on more than one channel.

Second, complete the current phase of execution for a given CPU socket on a particular channel once performance of the current phase of execution has been released. That is, once the particular channel within the given CPU socket has been released, the current phase of execution will be performed on all memory modules (e.g., DIMMs) associated with the particular channel and all ranks within the memory modules.

While various examples described herein may be described with reference to a specific boot processing goal (e.g., fastest execution without exceeding the power constraints of the computer system), it is to be appreciated the SMT approach is equally applicable to other boot processing goals (e.g., least boot time with some exceptions for exceeding the power constraints, execution that minimizes power utilization, execution that prioritizes boot time on given CPU sockets, and allows the flexibility to build asymmetric power constrains per CPU socket (e.g., more or less power delivered by the circuitry), etc.)

In the following description, numerous specific details are set forth in order to provide a thorough understanding of example embodiments. It will be apparent, however, to one skilled in the art that embodiments described herein may be practiced without some of these specific details.

Terminology

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments.

The term "storage media" as used herein refers to any non-transitory media that store data or instructions that cause a machine to operation in a specific fashion. Such storage media may comprise non-volatile media (e.g., a non-volatile BIOS memory) or volatile media. Non-volatile media includes, for example, a read-only memory (ROM) or flash memory or optical, magnetic or flash disks. Volatile media includes dynamic memory, such as main memory. Common forms of storage media include, for example, a flexible disk, a hard disk, a solid-state drive, a magnetic tape, or any other magnetic data storage medium, a CD-ROM, any other optical data storage medium, any physical medium with patterns of holes, a RAM, a ROM, flash memory, a PROM, and EPROM, a FLASH-EPROM, NVRAM, any other memory chip or cartridge.

As used herein "boot time" generally refers to the number of units of time to complete execution of memory training algorithms on all channels/sockets of a computer system at issue.

As used herein a "boot strap processor" or "BSP" generally refers to a CPU of multiple CPUs of a multi-socket computer system that starts fetching, decoding, and executing instructions at system startup time.

As used herein an "application socket" or "AP socket" generally refers to a non-BSP socket of a multi-socket computer system.

As used herein, "multithreading" generally refers to the ability of multiple CPU sockets of a multi-socket computer system configuration to concurrently execute various phases of memory training.

As used herein, a "memory configuration" for a given CPU socket generally refers to information regarding one or more of a number of channels within the given CPU socket, and for each channel of the given CPU socket: whether the channel is enabled or disabled (populated or not), a number of memory modules (e.g., DIMMs) available for use by the given CPU socket, and for each memory module of the given CPU socket: whether the memory module is enabled or disabled (populated or not), whether the use of error correcting code (ECC) is supported by the memory module, a type of the memory module (e.g., RDIMM, LRDIMM, UDIMM, etc.), the number of ranks within the memory module, and for each rank within the memory module: the data width (e.g., ×4, ×8, ×16), bank groups, banks, and density (4 Gigabit (Gb), 8 Gb, 16 Gb, 32 Gb and future densities).

Example Muti-Socket Computer System

FIG. 1 is a block diagram illustrating an example of multi-socket computer system configuration 100. In the context of the present example, the computer system includes a motherboard 120 having system firmware (e.g., a basic input/output system (BIOS) 130), multiple CPUs 110*a-d*, each coupled to respective CPU sockets 112*a-d*, and memories (e.g., DIMMs 113*a-b*) associated with each CPU 110*a-d*. A non-limiting example of a CPU socket (e.g., one of CPU sockets 112*a-d*) is described further below with reference to FIG. 2A. A non-limiting example of a DIMM (e.g., one of DIMMs 113*a-b*) is described further below with reference to FIG. 2B.

The system firmware (e.g., BIOS 130) is typically stored within a non-volatile memory (e.g., storage media 140, which may be a ROM or flash memory) and includes, among other code, code (e.g., memory reference code (MRC) 135) for performing memory training. The MRC may include code that is used to initialize memory controllers (not shown) and for performing various phases of memory training during POST. As noted above, it is generally desirable to bring the memories up as efficiently as possible so the computer system can complete the boot process quickly.

In the context of the present example, the CPUs are coupled in communication via low-latency coherent interconnects (e.g., point-to-point (P2P) processor interconnects (PIs) 111*a-f*). A non-limiting example, of a P2P PI is the Intel Ultra Path Interconnect (UPI). While the current example illustrates a 4-socket (4S)-3PI (3 processor interconnects to/from each CPU) platform topology, it is to be appreciated numerous other configurations are possible, including 2S-2PI, 2S-3PI, 4S-2PI, 8S-3PI, and 16S-3PI. Notably, these example computer system configurations are meant only to exemplify various possibilities and are not intended limit the scope of the present disclosure.

Example CPU Socket

Figures 2A, 2B:
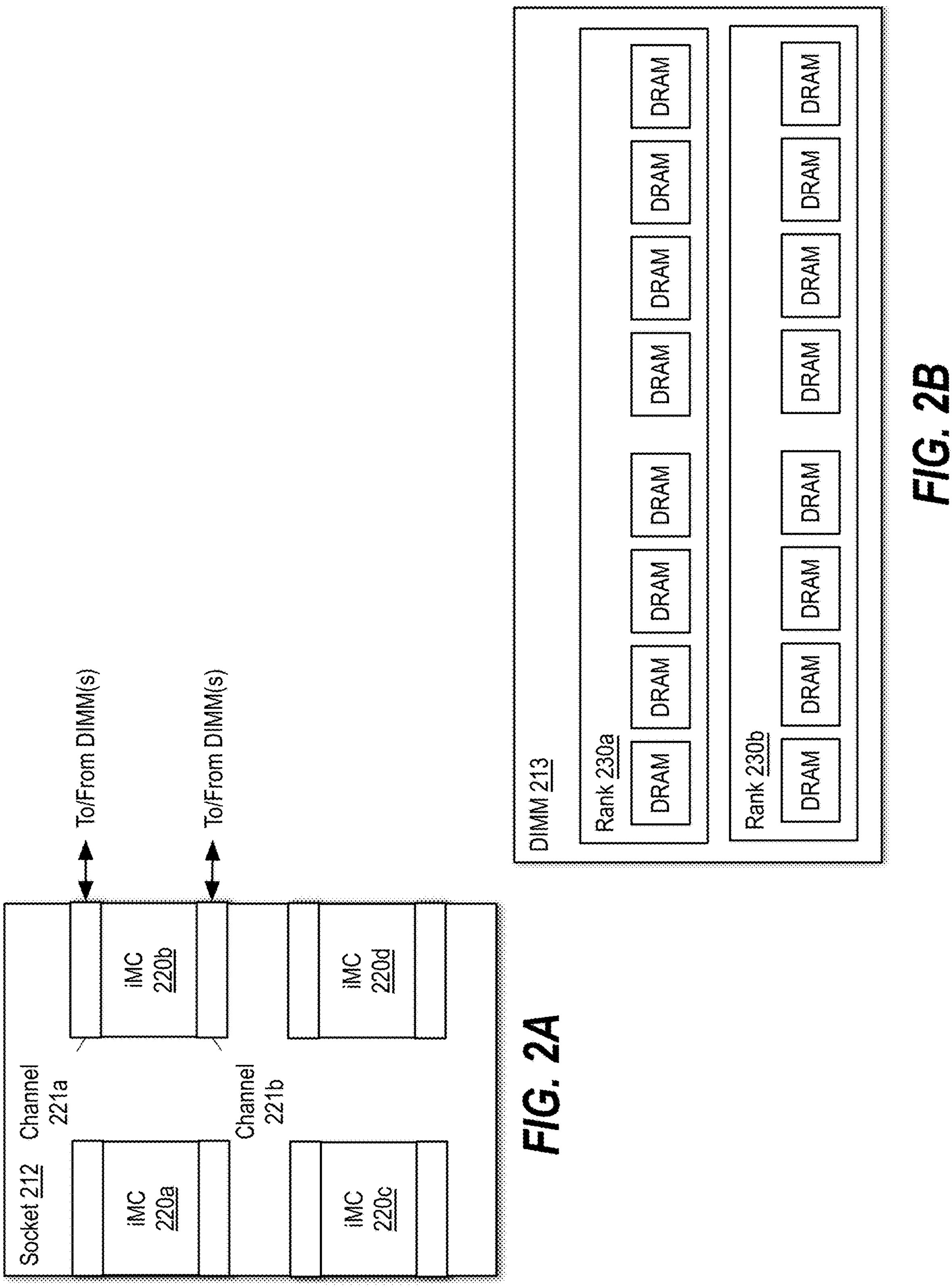
FIG. 2A is a block diagram illustrating an example of a CPU socket.
FIG. 2B is a block diagram illustrating an example of a DIMM.

FIG. 2A is a block diagram illustrating an example of a CPU socket 212, which may be referred to at times simply as a socket. Multi-channel memory architecture is a technology that increases the data transfer rate between memory and a memory controller by adding more channels of communication between them. In general, memory controllers are responsible for reading, writing, and refreshing the RAM by supplying the RAM with specific commands.

In the context of the present example, CPU socket 212 (which may be analogous to one of CPU sockets 112*a-d* of FIG. 1) is shown including its own memory subsystem in the form of four integrated memory controllers (iMCs) 220*a-d* of which iMC 220*b* is representative that includes two channels 221*a-b*, each representing a link between one or more DIMMs (e.g., DIMMs 113*a-b*) and the CPU coupled to the CPU socket 212. As those skilled in the art will appreciate, each iMC includes a specific number of channels as defined by the CPU to be supported by the CPU socket at issue. Each channel (e.g., channel 221*a-b*) is able to support a specific number of DIMMs, usually a maximum of two.

While in the context of the present example, a dual-channel memory architecture is described, the methodologies described herein are applicable to other current or future multi-channel memory architectures. Similarly, while the present example includes iMCs, the methodologies described herein are applicable to memory controllers that are not integrated and that are instead implemented as specialized peripherals.

Example DIMM

FIG. 2B is a block diagram illustrating an example of a DIMM 213. DIMM 213 may be analogous to one of DIMMs 113*a-b* of FIG. 1. A DIMM is a module that contains one or several RAM chips (e.g., DRAM chips having data width ×4, ×8, or ×16) on a small circuit board with pins that connect it to the motherboard (e.g., motherboard 120) of the computer system. Depending on the type of DIMM, multiple ranks can coexist on a single DIMM. For example, modern DIMMs can consist of one rank (single rank), two ranks (dual rank), four ranks (quad rank), or eight ranks (octal rank).

In the context of the present example, the DIMM 213 is a dual-rank DIMM including a top rank (e.g., rank 230*a*) and a bottom rank (e.g., rank 230*b*) each having multiple DRAM chips. As those skilled in the art will appreciate, there are Those skilled in the art will appreciate there are various types of DIMMs, including unbuffered (or unregistered) DIMM (UDIMM), registered (or buffered) DIMM (RDIMM), which include an additional buffer between the memory controller and the DRAM in the form of a register, and load-reduced (LRDIMM), which supports higher densities than RDIMMs and contains a memory buffer (MB) chip, in addition to the register, in order to reduce and minimize the load on the server memory bus. Notably, these example DIMMs are meant only to exemplify various possibilities and are not intended limit the scope of the present disclosure.

Tables Illustrating Limitations of Current Serial and Parallel MT Approaches

FIG. 3 is a table 300 illustrating units of time and units of power for each unit of time to perform serial execution of memory training for a particular computer system configuration having four CPU sockets and assuming two memory training phases. For purposes of facilitating comparison between serial and parallel MT approaches, and the proposed SMT approach, the following multi-socket computer system configuration will be used:

A measure of the power available at any given time (e.g., power constraints of the computer system or the maximum power consumption threshold), which may be expressed as power target available maximum (PTAM)) is assumed to be 1,000 units of power. Depending upon the particular implementation the units of power may be amperes (amps), volts, watts or even a percentage.

The computer system includes four sockets (e.g., sockets 112*a-d*), referred to below as socket 0, socket 1, socket 2, and socket 3 and abbreviated as S0, S1, S2, and S3, respectively, in FIG. 3.

Socket 0 includes one memory channel (e.g., channel 221*a*), abbreviated as C0 in FIG. 3, coupled to two single-rank DIMMs (e.g., DIMMs 113*a-b*), abbreviated as D0R0 and D1R0, respectively, in FIG. 3.

Socket 1 includes one memory channel, abbreviated as C0 in FIG. 3, coupled to two single rank DIMMs, abbreviated as D0R0 and D1R0, respectively, in FIG. 3.

Socket 2 includes one memory channel, abbreviated as C0 in FIG. 3, coupled to two single rank DIMMs, abbreviated as D0R0 and D1R0, respectively, in FIG. 3.

Socket 3 includes four memory channels, abbreviated as C0, C1, C2, and C3, respectively, in FIG. 3, each coupled to dual-rank DIMMs, the ranks of which are abbreviated as D0R0, D0R1, D1R0, D1R1, respectively for each channel.

In this example, two memory training algorithms (e.g., phase A (PA) and phase B (PB)) are performed. Execution of PA is assumed to consume 250 units of power per rank (PPR) and the time to boot per rank (TBR) for PA is assumed to be 2 units of time. Execution of PB is assumed to consume 100 units of PPR and the TBR for PB is assumed to be 3 units of time.

In the context of FIG. 3, each row corresponds to a given rank under test (represented by an "R" followed by a rank number 0-1) of a given DIMM (represented by a "D" followed by a DIMM number 0-1) of a given channel (represented by a "C" followed by a channel number 0-3) of a given socket (represented by an "S" followed by the socket number 0-3). So, for example, in the first row of table 300, S0C0D0R0 represents socket 0, channel 0, DIMM 0, rank 0. Each column of table 300 identifies a given phase (or memory training algorithm) of the MRC executed on the corresponding socket/channel/DIMM/rank under test during the unit of time (T1, T2, T3, etc.) at issue.

Each phase (or memory training algorithm) of the MRC is performed on one rank (R) of one DIMM (D) of each channel (C) of one socket (S) at a time in a serial fashion. So, all channels of a given socket may run in parallel and once a given channel within a socket starts a given phase of execution, all DIMMs/ranks follow serially as execution of the given phase of execution on the prior DIMMs/ranks are completed.

In the present scenario, training algorithm PA is executed on S0C0D0R0 during time 0 (T0) and during time 1 (T1) while all other sockets are inactive, training algorithm PA is then executed on S0C0D1R0 during time 2 (T2) and during time 3 (T3) while all other sockets remain inactive, training algorithm PA is then executed on S1C0D0R0 during time 4 (T4) and during time 5 (T5) while all other sockets remain inactive, training algorithm PA is then executed on S1C0D1R0 during time 6 (T6) and during time 7 (T7), training algorithm PA is then executed on S2C0D0R0 during time 8 (T8) and during time 9 (T9) while all other sockets remain inactive, and training algorithm PA is then executed on S2C0D1R0 during time 10 (T10) and during time 11 (T11) while all other sockets remain inactive. During time 12 (T12) and time 13 (T13) all four channels of socket 3 execute training algorithm PA in parallel on S3C0D0R0, S3C1D0R0, S3C2D0R0, and S3C3D0R0 while all other sockets remain inactive, followed by parallel execution of algorithm PA during time 14 (T14) and time 15 (T15) on S3C0D0R1, S3C1D0R1, S3C2D0R1, and S3C3D0R1 while all other sockets remain inactive and so on. After execution of training algorithm PA has been completed, the same serial process of scheduling training algorithm PB begins, but training algorithm PB take 3 units of time to complete. Because of the serial approach, the total power consumed during a given unit of time is always at or below the PTAM of 1,000; however, the serial approach takes 49 units of time to complete.

FIG. 4 is a table 400 illustrating units of time and units of power for each unit of time to perform fully parallel execution of memory training for the same computer system configuration and memory training phases as FIG. 3. Table 400 uses the same abbreviations and follows the same conventions as table 300 for representing a given rank under test of a given DIMM of a given channel of a given socket; however, in this example, each phase (or memory training algorithm) of the MRC is performed on one rank of one DIMM of each channel of all sockets in parallel.

In the present scenario, training algorithm PA is executed on each of S0C0D0R0, S1C0D0R0, S2C0D0R0, S3C0D0R0, S3C1D0R0, S3C2D0R0, and S3C3D0R0 in parallel during time 0 (TO) and during time 1 (T1), training algorithm PA is then executed on each of S0C0D1R0, S1C0D1R0, S2C0D1R0, S3C0D0R1, S3C1D0R1, S3C2D0R1, and S3C3D0R1 in parallel during time 2 (T2) and during time 3 (T3), and so on.

As a result of the parallel approach, completing execution of the two memory training algorithms takes only 19 units of time; however, during T1-T4, the PTAM of 1,000 is exceeded by 75% and during T4-T7, the PTAM of 1,000 is exceeded by 30%. Depending on the power circuitry robustness (which is a factor of the quality and cost of the motherboard), the computer system may or may not be able to support the overcurrent. If not, the CPUs and/or the DIMMs may be damaged.

Selective Multithreading (SMT)

Figure 5:
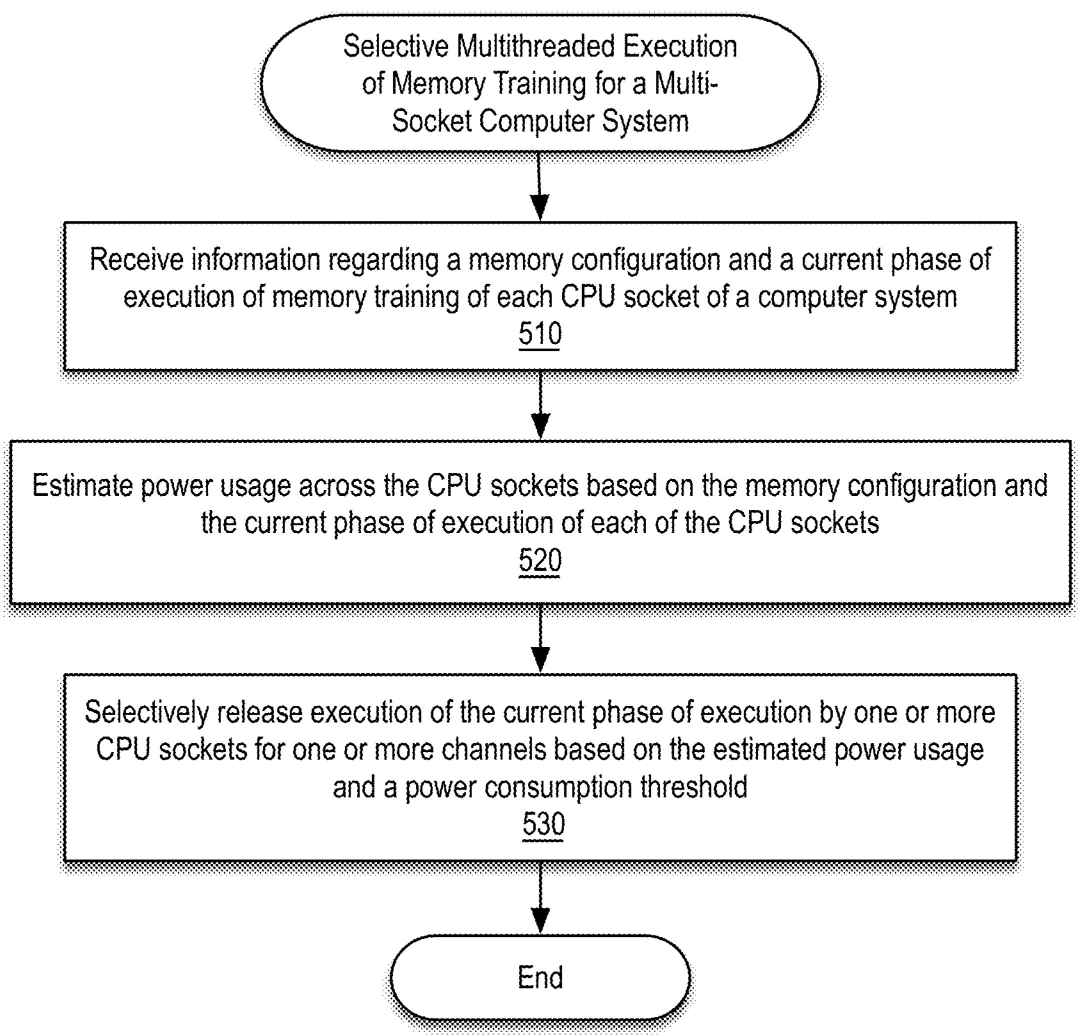
FIG. 5 is a flow diagram illustrating operations for performing selective multithreaded execution of memory training for a multi-socket computer system configuration according to some embodiments.

FIG. 5 is a flow diagram illustrating operations for performing selective multithreaded execution of memory training for a multi-socket computer system configuration according to some embodiments. The processing described with reference to FIG. 5 represents processing that may be performed by a main scheduler running on a boot strap processor (BSP) (e.g., one of CPUs 110*a-d*) of a high-end server platform (e.g., computer system 100), such as an application server designed for a data center environment. The training may relate to the execution of training algorithms included within an MRC (e.g., MRC 135) of a BIOS (e.g., BIOS 130) that are appropriate for the potentially different memory configurations of the respective CPU sockets.

At block 510, information is received regarding a memory configuration and a current phase of execution of memory training of each CPU socket (e.g., each of sockets 112*a-d*) of the computer system. According to one embodiment, the memory configuration of a given CPU socket includes information regarding one or more of a number of channels (e.g., channel 221*a-b*) within the given CPU socket, and for each channel of the given CPU socket: whether the channel is enabled or disabled (populated or not), a number of memory modules (e.g., DIMMs 113*a-b*) available for use by the given CPU socket, and for each memory module of the given CPU socket: whether the memory module is enabled or disabled (populated or not), whether the use of error correcting code (ECC) is supported by the memory module, a type of the memory module (e.g., RDIMM, LRDIMM, or UDIMM), the number of ranks (e.g., ranks 230*a-b*) within the memory module, and for each rank within the memory module: the data width (e.g., ×4, ×8, ×16), bank groups, banks, and density (4 Gigabit (Gb), 8 Gb, 16 Gb, 32 Gb).

In one embodiment, the current phase of execution for a given CPU socket represents a training algorithm that has been selected to be performed by a local scheduler running on the given CPU socket and that is awaiting release of execution on one or more channels of the given CPU socket. For example, the MRC may be split into several phases (which may also be referred to as training algorithms). Each one of these phases may consume different amounts of power, for example, based on the memory configuration, test pattern generation, test pattern length, and other electrical characteristics.

The interface (e.g., physical connection and protocol) through which the CPU sockets communicate with the BSP may vary depending upon the particular implementation. This interface may be a serial port, a universal asynchronous receiver/transmitter (UART), a scratch pad (e.g., one or more registers) associated with the CPU socket, and the like. For example, a given CPU socket may store information to a scratch pad accessible by the BSP and the BSP may read the scratch pad via a prescribed protocol.

At block 520, power usage across the CPU sockets is estimated based on the memory configurations and the current phase of execution of the CPU sockets. According to one embodiment, the power usage for a given CPU socket is estimated by determining power consumption on a per-channel, per-memory module, and per rank under test basis for the current phase of execution of the given CPU socket. Various values and equations that may be used to calculate power usage are listed below in Table 1.

TABLE 1

Values and Equations for Calculation of Power Consumption

| Value | Equation |
|---|---|
| PPR | N/A - In one embodiment, this is a fixed value provided by the CPU vendor. During each phase, DIMMs/ranks within the channel operate serially. |
| PA | Initially, $PA = PTAM$ Later, $PA = PA - PCS$ After a CPU socket completes execution, $PA = PA + PPR_S$ |
| PTAM | N/A - In one embodiment, this value is an input, for example, provided during the boot process based on the design of the motherboard of the computer system at issue. |
| PCM | $PCM = \sum_{S=0}^{N-1} PPR_S$ (for each channel) |
| PCS | $PCS = \sum_{S=0}^{N-1} PPR_S$ (for executed channel) |
| TBR | N/A - In one embodiment, this is a fixed value provided by the CPU vendor. |
| TBM | $TBM = \sum_{S=0}^{N-1} TBR_S$ (for each channel) |
| TBS | $TBS = \sum_{S=0}^{N-1} TBR_S$ (for executed channel) |

In Table 1, PPR stands for a Power Per Rank estimation for a given phase of execution. In one example, PPR is a fixed number provided by the CPU vendor.

PA stands for Power Available. Initially, this number is equal to PTAM. This number is updated dynamically based on the number of channels/sockets that are released at each unit of time.

PTAM stands for Power Target Available (Maximum) at any given time. In one example, the value of PTAM is an upper bound or maximum threshold on power consumption (units of power per unit of time) by the computer system at any given time, for example, as limited by power constraints of the computer system (e.g., VRMs of the motherboard) or as otherwise specified by a maximum power consumption threshold. In one embodiment, PTAM is an input to the main scheduler running on the BSP, for example, a value that may be read during the boot process that is set based on the design of the motherboard of the computer system at issue.

PCM stands for Power Consumption (Maximum). In one embodiment, the calculation of PCM is based on an assumption that all populated channels and sockets of the computer system at issue are executed concurrently.

PCS stands for Power Consumption (Selected). Assuming the power constraints of the computer system at issue do not accommodate performance of fully parallel execution of memory training on all populated channels and sockets of the computer system at issue, PCS represents the power consumption for a specific subset of channels/sockets on which a given training algorithm will be scheduled for execution.

TBR stands for Time to Boot per Rank. In one embodiment, the value of TBR is a fixed number provided by the CPU vendor, for example, based on their estimations and internal testing.

TBM stands for Time to Boot (Minimum). Assuming the computer system at issue can be run at PCM, TBM represents an estimate of the boot time.

TBS stands for Time to Boot (Selected). Assuming the power constraints of the computer system at issue do not accommodate performance of fully parallel execution of memory training on all populated channels and sockets of the computer system at issue, TBS represents the boot time estimation based on PCS.

According to one embodiment, an initial estimated power usage across the CPU sockets of the computer system at issue may be performed by the main scheduler by estimating PCM across all CPU sockets.

At block 530, the current phase of execution by one or more CPU sockets for one or more channels is selectively released based on the estimated power usage and a power consumption threshold (e.g., PA or PTAM, as the case may be) for the computer system. In one embodiment, the selection of CPU sockets and channels is performed in accordance with a breadth-first approach that prioritizes accommodating at least one task (channel) per socket to get some parallelization going. That is, an attempt is made to release at least one channel per socket subject to power availability (e.g., PA or PTAM, as the case may be). In one embodiment, a secondary consideration is completing the current phase of execution for a given CPU socket on a particular channel once performance of the current phase of execution has been released. That is, once the particular channel within the given CPU socket has been released, the current phase of execution will be performed on all memory modules (e.g., DIMMs) associated with the particular channel and all ranks within the memory modules.

Additional discussion regarding the iterative nature of the proposed SMT approach and interactions among and between the BSP and the AP sockets are described further below with reference to FIG. 7.

While in the context of the present example, the boot processing goal relates to minimizing boot time without exceeding current power availability (e.g., a maximum power consumption threshold and/or the power constraints of the computer system), it is to be appreciated the methodologies described herein are equally applicable to other boot processing goals, including, but not limited to minimizing power consumption during boot time). Additionally, as noted above, there may be circumstances in which it is acceptable to exceed power availability. For example, if a sufficient reduction in boot time (e.g., X % or more) can be achieved by exceeding a power consumption threshold (e.g., by Y % or less) for a limited number of time units, the main scheduler may proceed with scheduling of training algorithms in excess of the power consumption threshold.

FIG. 6 is a table 600 illustrating units of time and units of power for each unit of time to perform selective multithreading of memory training for the same computer system configuration and memory training phases as FIGS. 3 and 4. Table 600 uses the same abbreviations and follows the same conventions as tables 300 and 400 for representing a given rank under test of a given DIMM of a given channel of a given socket; however, in this example, each phase (or memory training algorithm) of the MRC is released for a given socket and a specified number of channels in parallel in accordance with the SMT approach described above with reference to FIG. 5, while attempting to accommodate at least one task per socket and once a channel within a socket is released for a given phase of execution, all DIMMs/ranks are executed.

In the context of the present example, training algorithm PA is executed on each of S0C0D0R0, S1C0D0R0, S2C0D0R0, S3C0D0R0 in parallel during time 0 (TO) and during time 1 (T1), training algorithm PA is then executed on each of S0C0D1R0, S1C0D1R0, S2C0D1R0, S3C0D0R1 in parallel during time 2 (T2) and during time 3 (T3), training algorithm PA is then executed on each of S3C0D1R0, S3C1D0R0, S3C2D0R0, S3C0D0R0 in parallel during time 4 (T4) and during time 5 (T5), and the overlap of execution of training algorithm PB and PA is delayed until time 8 (T8).

As will be appreciated with reference to table 600, as a result of the proposed SMT approach, the time to finish execution of the two memory training algorithms is 23 units, which represents 21% more than the fully parallel approach (as illustrated by table 400 of FIG. 4) and a 53% time savings as compared to the serial mode of execution (as illustrated by table 300 of FIG. 3). Meanwhile, the total power consumed during any given unit of time is at or below the PTAM of 1,000. So, there is no risk of damage to the CPUs or the DIMMs due to overcurrent.

While various examples described herein may use the PTAM as a threshold beyond which no further execution of training algorithms may be released, it is to be appreciated that for limited periods of time, it may be acceptable to exceed the PTAM. As such in alternative embodiments, the main scheduler may extend the threshold to PTAM plus a predefined and/or configurable factor for a predefined and/or configurable number of units of time, for example, if it is determined that a sufficient improvement in completion of execution of the training algorithms will be achieved as a result. For example, if a 10% reduction or more in time units can be achieved, the main scheduler may increase the threshold for a limited number of consecutive time units, whereas if such a reduction cannot be achieved, the main scheduler may continue to use PTAM as the power consumption threshold.

Figure 7:
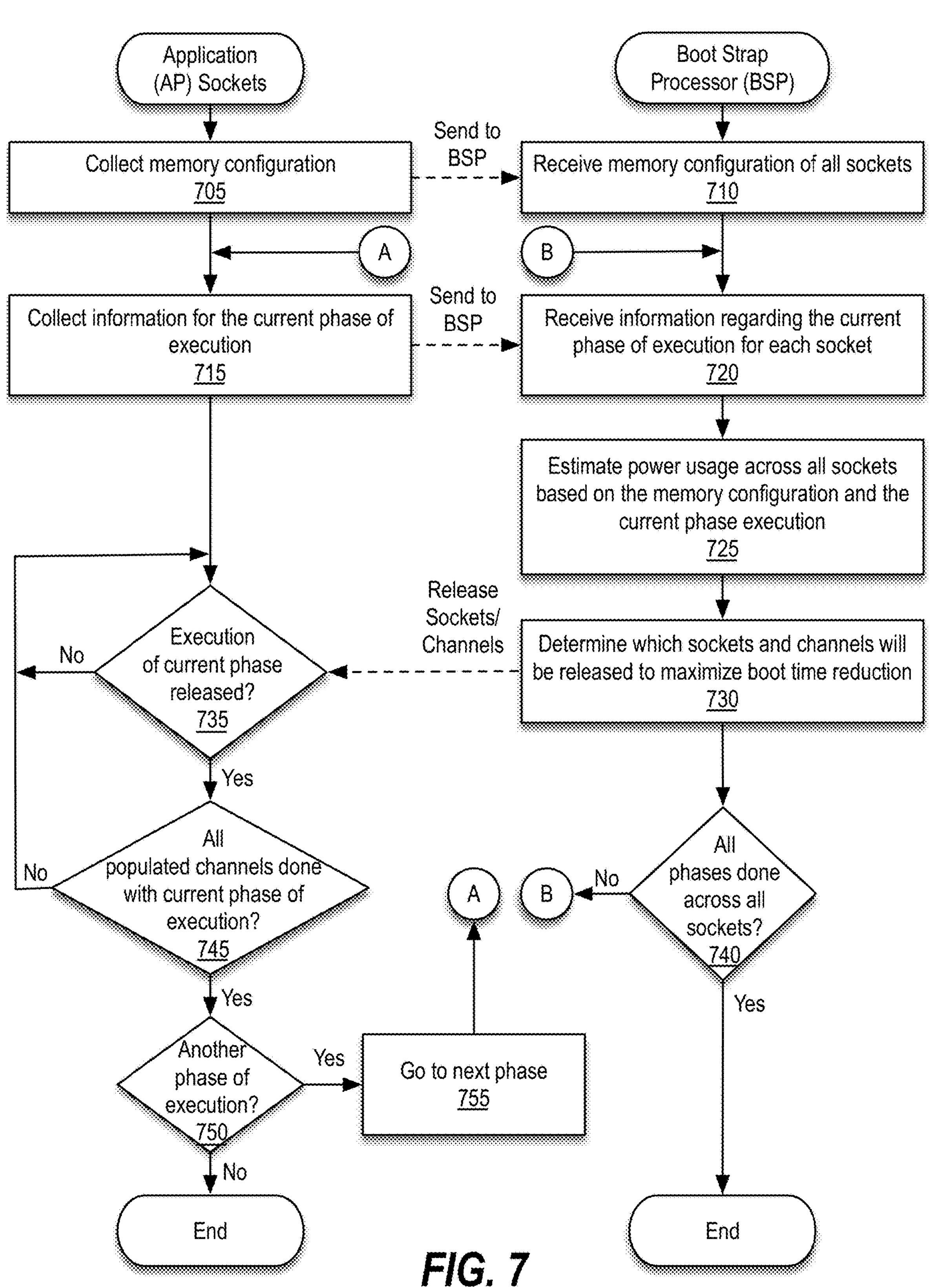
FIG. 7 is a flow diagram illustrating interactions between a boot strap processor (BSP) and application (AP) sockets during selective multithreaded execution of memory training according to some embodiments.

FIG. 7 is a flow diagram illustrating interactions between a boot strap processor (BSP) and application (AP) sockets during selective multithreaded execution of memory training according to some embodiments.

In general, for each phase the power consumption may be estimated per channel/DIMM/rank under test. Then, using the estimated power consumption per phase and the memory configuration of each CPU socket, the system firmware can decide: (i) the number of sockets that will be executed and (i) the number of channels within each socket that can be executed concurrently.

In the context of the present example, the boot processing goal is to minimize boot time and keep power consumption within platform limitations. During the early stage in the MRC execution, each CPU socket collects information about its memory configuration for each one of the channels (e.g., channels 221*a*-*b*) and sends that information to the BSP. Additionally, during each iteration, each CPU socket sends information regarding its current phase of execution, for example, as selected to be performed by a local scheduler to the BSP to facilitate decision making by the main scheduler. For example, as described further below, after the BSP receives the memory configuration and current phase information, it may proceed to estimate the maximum power consumption across all channels and sockets. Then, based on the estimate, the BSP may determine how many channels per socket can be released based in power constraints in accordance with a prioritization approach (e.g., the breadth-first approach that prioritizes accommodating at least one task (channel) per socket to get some parallelization going).

At block 705, a given AP socket collects information regarding the memory configuration of its channels and sends the collected information to the BSP. According to one embodiment, the memory configuration includes information regarding the number of channels within the given AP socket, for each channel of the given AP CPU socket: whether the channel is enabled or disabled (populated or not), a number of memory modules (e.g., DIMMs 113*a*-*b*) available for use by the given AP socket, for each memory module of the given AP socket: whether the memory module is enabled or disabled (populated or not), whether the use of error correcting code (ECC) is supported by the memory module, a type of the memory module (e.g., RDIMM, LRDIMM, or UDIMM), the number of ranks (e.g., ranks 230*a*-*b*) within the memory module, and for each rank within the memory module: the data width (e.g., ×4, ×8, ×16), bank groups, banks, and/or density (4 Gigabit (Gb), 8 Gb, 16 Gb, 32 Gb).

At block 710, the BSP receives the memory configuration of all of the AP sockets.

At block 715, the given AP socket collects information regarding the current phase of execution and sends the collected information to the BSP. For example, a local scheduler associated with the given AP socket may create a list of a number of training algorithms to be sequentially performed on a channel-by-channel basis based on the memory configuration of the given AP socket and the first unexecuted training algorithm in the list may represent the current phase of execution.

At block 720, the BSP receives the memory configuration of all of the AP sockets.

At block 725, the BSP estimates the power usage across all AP sockets based on the memory configuration and the current phase of execution of each of the AP sockets. According to one embodiment, the power consumption estimate for a given AP socket is determined by calculating power consumption on a per-channel, per-memory module, and per rank under test basis for the current phase of execution of the given AP socket. For example, the main scheduler of the BSP may utilize the values and equations noted above in Table 1 to calculate power consumption.

At decision block 725, the given AP socket determines whether execution of the current phase has been released. If so, processing for the given AP socket continues with decision block 745; otherwise, processing for the given AP socket loops back to decision block 735 to await such release.

At block 730, the BSP determines which AP sockets and channels will be released to maximize boot time reduction and releases the specifically identified AP sockets and the number of channels that may be executed concurrently for each of the specifically identified AP sockets by sending the information to the respective AP sockets. According to one embodiment, the BSP seeks to maximize parallelization of concurrent channel execution while also staying within power constraints of the computer system. For example, the determination of which sockets and channels to be released may involve selecting the maximum number of channels across the AP sockets for which the current phase of execution of the respective AP socket may be released without exceeding the power available (PA) at that time, for example, as initially defined by PTAM (e.g., a maximum power consumption threshold or power constraints of the computer system.

As will be appreciated by those skilled in the art and referring back to Table 1, the total power available (PA) at a given time may change from iteration to iteration based on the phase of the sockets (e.g., initially, PA=PTAM). Later, power is being used by AP sockets that are executing so, PA=PA−PCS. Similarly, after an AP socket has completed execution, PA=PA+$PPR_S$. As such, the main scheduler may maintain a data structure containing information regarding the status of each socket (e.g., in process, executing, completed).

At decision block 740, the BSP determines whether all phases are done across all AP sockets. If so, BSP processing is complete; otherwise, BSP processing loops back to block 720 for another iteration. As will be appreciated by those skilled in the art, the power consumption may change for each iteration based on the current state of execution of each of the AP sockets. Also, a given AP socket may go faster or slower than another AP socket as a result of performing different training algorithms or phases and/or having more of fewer channels with different memory configurations.

At decision block 745, the given AP socket determines whether all populated channels are done with the current phase of execution. If so, processing continues with decision block 750; otherwise the given AP socket awaits release of the current phase of execution for one or more additional channels by looping back to decision block 735.

At decision block 750, the given AP socket determines whether there is another phase of execution to be performed. If so, processing branches to block 755; otherwise, boot time processing for the given AP socket is complete.

At block 755, the given AP socket advances to the next phase of execution and loops back to block 715.

While in the context of the present example, reference is made to the AP sockets sending information to the BSP and the BSP receiving information from the AP sockets, it is to be appreciated the BSP may actively participate in this process, for example, by retrieving the information from a scratch pad (e.g., a set of one or more registers) associated with a given AP socket.

While in the context of the flow diagrams presented herein, a number of enumerated blocks are included, it is to be understood that the examples may include additional blocks before, after, and/or in between the enumerated blocks. Similarly, in some examples, one or more of the enumerated blocks may be omitted or performed in a different order.

While many of the methods may be described herein in a basic form, it is to be noted that processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that include a non-transitory machine-readable medium storing instructions, which when executed by a processor of a computer system cause the processor to: determine an estimated power usage across a plurality of sockets of the computer system based on information regarding a memory configuration of each of the plurality of sockets and information regarding a current phase of execution of memory training for each of the plurality of sockets; and selectively release performance of the current phase of execution by one or more sockets of the plurality of sockets for one or more channels of the one or more sockets based on the estimated power usage and a power consumption threshold in an effort to achieve one or more boot processing goals.

Example 2 includes the subject matter of Example 1, wherein the instructions further cause the processor to prioritize performance of the current phase of execution of each socket of the one or more sockets on at least one channel of the socket over allowing performance of the current phase of execution of a given socket of the one or more sockets on multiple channels of the given socket.

Example 3 includes the subject matter of Examples 1-2, wherein after performance of the current phase of execution of a given socket has been released for a given channel of the given socket, the current phase of execution is performed for all memory modules associated with the given channel and for all ranks of the memory modules.

Example 4 includes the subject matter of Examples 1-3, wherein the instructions further cause the processor to receive the power consumption threshold as a boot-time input parameter expressed as a unit of energy per unit of time.

Example 5 includes the subject matter of Examples 1-4, wherein the one or more boot processing goals comprise minimizing boot time of the computer system while also keeping the current aggregate power usage at or below the power consumption threshold.

Example 6 includes the subject matter of Examples 1-5, wherein the processor comprises a boot strap processor (BSP) of the computer system and wherein the BSP releases performance of the current phase of execution for a given application processor (AP) socket of the plurality of sockets by communicating to the AP socket a number of channels for which the AP socket may concurrently perform the current phase of execution.

Example 7 includes the subject matter of Examples 1-6, wherein the current phase of execution of a given socket of the plurality of sockets comprises a memory reference code (MRC) memory training algorithm of a plurality of MRC memory training algorithms each potentially having a different power consumption requirement.

Example 8 includes the subject matter of Examples 1-7, wherein determination of the estimated power usage includes for each socket of the plurality of sockets, determining power consumption on a per-channel, per-memory module, and per rank under test basis for the current phase of execution of the socket.

Example 9 includes the subject matter of Examples 1-8, wherein the memory configuration for a given socket of the plurality of sockets includes: for each channel of the given socket: whether the channel is enabled; and for each memory module of the channel: whether the memory module is enabled; a type of the memory module; a number of ranks within the memory module; and for each rank of the rank of the memory module: a data width; and a density.

Some embodiments pertain to Example 10 that includes a method comprising: receiving a memory configuration and a current phase of execution of memory training for each of a plurality of central processing unit (CPU) sockets of a computer system; determining an estimated power usage across a plurality of CPU sockets based on the memory configuration and the current phase of execution of each of the plurality of CPU sockets; and selectively releasing performance of the current phase of execution by one or more CPU sockets of the plurality of CPU sockets for one or more channels of the one or more CPU sockets based on the estimated power usage and a power consumption threshold.

Example 11 includes the subject matter of Example 10, further comprising prioritizing performance of the current phase of execution of each CPU socket of the one or more CPU sockets on one channel of the CPU socket over allowing performance of the current phase of execution of a given CPU socket of the one or more CPU sockets on given channels of the given CPU socket.

Example 12 includes the subject matter of Examples 10-11, wherein after performance of the current phase of execution of a given CPU socket has been released for a given channel of the given CPU socket, the current phase of execution is performed for all memory modules associated with the given channel and for all ranks of the memory modules.

Example 13 includes the subject matter of Example 10-12, wherein said selectively releasing execution is performed to minimize boot time of the computer system while also keeping the current aggregate power usage at or below the power consumption threshold.

Example 14 includes the subject matter of Examples 10-13, wherein the current phase of execution of a given CPU socket of the plurality of CPU sockets comprises a memory reference code (MRC) memory training algorithm of a plurality of MRC memory training algorithms each potentially having a different power consumption requirement.

Example 15 includes the subject matter of Examples 10-14, wherein said determining an estimated power usage includes for each CPU socket of the plurality of CPU sockets, determining power consumption on a per-channel, per-memory module, and per rank under test basis for the current phase of execution of the CPU socket.

Some embodiments pertain to Example 16 that includes a computer system comprising: a boot strap processor; a plurality of sockets; and instructions that when executed by a boot strap processor (BSP) cause the BSP to: receive a memory configuration and a current phase of execution of memory training for each of the plurality of sockets; determine an estimated power usage across the plurality of sockets based on the memory configuration and the current phase of execution of each of the plurality of sockets; and release performance of the current phase of execution by a subset of the plurality of sockets of the plurality of sockets for one or more channels of the subset of sockets based on the estimated power usage and a power consumption threshold.

Example 17 includes the subject matter of Example 16, wherein the instructions further cause the BSP to prioritize performance of the current phase of execution of each socket of the subset of sockets on one channel of the socket over allowing performance of the current phase of execution of a given socket of the subset of sockets on two or more channels of the given CPU socket.

Example 18 includes the subject matter of Examples 16-17, wherein after performance of the current phase of execution of a given socket has been released for a given channel of the given socket, the current phase of execution is performed for all memory modules associated with the given channel and for all ranks of the memory modules.

Example 19 includes the subject matter of Examples 16-18, wherein releasing performance of the current phase of execution is performed to minimize boot time of the computer system while also keeping the current aggregate power usage at or below the power consumption threshold.

Example 20 includes the subject matter of Examples 16-19, wherein determination of the estimated power usage includes for each socket of the plurality of sockets, determining power consumption on a per-channel, per-memory module, and per rank under test basis for the current phase of execution of the socket.

Some embodiments pertain to Example 21 that includes an apparatus or system that implements or performs a method of any of Examples 10-15.

Example 22 includes at least one machine-readable medium comprising a plurality of instructions, when executed on a computing device, implement or perform a method or realize an apparatus as described in any preceding Example.

Example 23 includes an apparatus or system comprising means for performing a method as claimed in any of Examples 10-15.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A non-transitory machine-readable medium storing instructions, which when executed by a processor of a computer system cause the processor to:

determine an estimated power usage across a plurality of sockets of the computer system based on information regarding a memory configuration of each of the plurality of sockets and information regarding a current phase of execution of memory training for each of the plurality of sockets; and in accordance with one or more boot processing goals, enabling performance, by one or more sockets of the plurality of sockets, of the current phase of execution for one or more channels of the one or more sockets by selectively releasing performance of the current phase of execution by the one or more sockets based on the estimated power usage and a power consumption threshold.

2. The non-transitory machine-readable medium of claim 1, wherein the instructions further cause the processor to prioritize performance of the current phase of execution of each socket of the one or more sockets on at least one channel of the socket over allowing performance of the current phase of execution of a given socket of the one or more sockets on multiple channels of the given socket.

3. The non-transitory machine-readable medium of claim 1, wherein after performance of the current phase of execution of a given socket has been released for a given channel of the given socket, the current phase of execution is performed for all memory modules associated with the given channel and for all ranks of the memory modules.

4. The non-transitory machine-readable medium of claim 1, wherein the instructions further cause the processor to receive the power consumption threshold as a boot-time input parameter expressed as a unit of energy per unit of time.

5. The non-transitory machine-readable medium of claim 1, wherein the one or more boot processing goals comprise minimizing boot time of the computer system while also keeping a current aggregate power usage by the plurality of sockets at or below the power consumption threshold.

6. The non-transitory machine-readable medium of claim 1, wherein the processor comprises a boot strap processor (BSP) of the computer system and wherein the BSP releases performance of the current phase of execution for a given application processor (AP) socket of the plurality of sockets by communicating to the AP socket a number of channels for which the AP socket may concurrently perform the current phase of execution.

7. The non-transitory machine-readable medium of claim 1, wherein the current phase of execution of a given socket of the plurality of sockets comprises a memory reference code (MRC) memory training algorithm of a plurality of MRC memory training algorithms each potentially having a different power consumption requirement.

8. The non-transitory machine-readable medium of claim 1, wherein determination of the estimated power usage includes for each socket of the plurality of sockets, determining power consumption on a per-channel, per-memory module, and per rank under test basis for the current phase of execution of the socket.

9. The non-transitory machine-readable medium of claim 1, wherein the memory configuration for a given socket of the plurality of sockets includes:

for each channel of the given socket:
  whether the channel is enabled; and
  for each memory module of the channel:
    whether the memory module is enabled;
    a type of the memory module;
    a number of ranks within the memory module; and
    for each rank of the rank of the memory module:
      a data width; and
      a density.

10. A method comprising: receiving a memory configuration and a current phase of execution of memory training for each of a plurality of central processing unit (CPU) sockets of a computer system; determining an estimated power usage across the plurality of CPU sockets based on the memory configuration and the current phase of execution of each of the plurality of CPU sockets; and enabling performance, by one or more CPU sockets of the plurality of CPU sockets, of the current phase of execution for one or more channels of the one or more CPU sockets by selectively releasing performance of the current phase of execution by the one or more CPU sockets based on the estimated power usage and a power consumption threshold.

11. The method of claim 10, further comprising prioritizing performance of the current phase of execution of each CPU socket of the one or more CPU sockets on one channel of the CPU socket over allowing performance of the current phase of execution of a given CPU socket of the one or more CPU sockets on given channels of the given CPU socket.

12. The method of claim 10, wherein after performance of the current phase of execution of a given CPU socket has been released for a given channel of the given CPU socket, the current phase of execution is performed for all memory modules associated with the given channel and for all ranks of the memory modules.

13. The method of claim 10, wherein said selectively releasing performance of the current phase of execution by the one or more CPU sockets is performed to minimize boot time of the computer system while also keeping a current aggregate power usage at or below the power consumption threshold.

14. The method of claim 10, wherein the current phase of execution of a given CPU socket of the plurality of CPU sockets comprises a memory reference code (MRC) memory training algorithm of a plurality of MRC memory training algorithms each potentially having a different power consumption requirement.

15. The method of claim 10, wherein said determining an estimated power usage includes for each CPU socket of the plurality of CPU sockets, determining power consumption on a per-channel, per-memory module, and per rank under test basis for the current phase of execution of the CPU socket.

16. A computer system comprising:

a boot strap processor (BSP);

a plurality of sockets; and instructions that when executed by the BSP cause the BSP to:

receive a memory configuration and a current phase of execution of memory training for each of the plurality of sockets;

determine an estimated power usage across the plurality of sockets based on the memory configuration and the current phase of execution of each of the plurality of sockets; and enabling performance, by one or more CPU sockets of the plurality of CPU sockets, of the current phase of execution for one or more channels of the one or more CPU sockets by releasing performance of the current phase of execution by a subset of the plurality of sockets of the plurality of sockets for one or more channels of the subset of sockets based on the estimated power usage and a power consumption threshold.

17. The system of claim 16, wherein the instructions further cause the BSP to prioritize performance of the current phase of execution of each socket of the subset of sockets on one channel of the socket over allowing performance of the current phase of execution of a given socket of the subset of sockets on two or more channels of the given socket.

18. The system of claim 16, wherein after performance of the current phase of execution of a given socket has been released for a given channel of the given socket, the current phase of execution is performed for all memory modules associated with the given channel and for all ranks of the memory modules.

19. The system of claim 16, wherein releasing performance of the current phase of execution is performed to minimize boot time of the computer system while also keeping a current aggregate power usage by the plurality of sockets at or below the power consumption threshold.

20. The system of claim 16, wherein determination of the estimated power usage includes for each socket of the plurality of sockets, determining power consumption on a per-channel, per-memory module, and per rank under test basis for the current phase of execution of the socket.

* * * * *